(12) United States Patent
Wieczorek et al.

(10) Patent No.: US 7,797,407 B2
(45) Date of Patent: Sep. 14, 2010

(54) SYSTEM FOR MODELING A PROCESS

(75) Inventors: Thomas G. Wieczorek, Meckesheim (DE); Doris R. Jaeckle, Munich (DE)

(73) Assignee: SAP AG, Walldorf (DE)

( * ) Notice: Subject to any disclaimer, the term of this patent is extended or adjusted under 35 U.S.C. 154(b) by 1123 days.

(21) Appl. No.: 11/370,117

(22) Filed: Dec. 28, 2005

(65) Prior Publication Data

US 2006/0184668 A1    Aug. 17, 2006

(30) Foreign Application Priority Data

Dec. 30, 2004    (EP) .................................. 04107063

(51) Int. Cl.
*G06F 15/177*    (2006.01)
*G06Q 10/00*    (2006.01)

(52) U.S. Cl. ........................................ 709/221; 705/28
(58) Field of Classification Search ................ 709/221, 709/222, 224; 705/28
See application file for complete search history.

(56) References Cited

U.S. PATENT DOCUMENTS

| | | | |
|---|---|---|---|
| 5,684,807 A * | 11/1997 | Bianchini et al. | 714/712 |
| 6,668,295 B1 * | 12/2003 | Chan | 710/200 |
| 6,910,053 B1 * | 6/2005 | Pauly et al. | 707/203 |
| 2004/0203711 A1 * | 10/2004 | O'Neill et al. | 455/422.1 |
| 2005/0149629 A1 * | 7/2005 | Kidd et al. | 709/224 |
| 2005/0201299 A1 * | 9/2005 | Radi et al. | 370/254 |

* cited by examiner

*Primary Examiner*—Wing F Chan
*Assistant Examiner*—Jonathan Willis
(74) *Attorney, Agent, or Firm*—Blakely, Sokoloff, Taylor & Zafman, LLP

(57) ABSTRACT

A system of a plurality of interconnectable nodes for modelling states; wherein one predetermined node is configured to act as a master node, the master node being configured to instantiate a state by creating the state and distributing the created state to at least one of the nodes, the master node being further configured to modify a state by changing the state and distributing the changed state to at least one of the nodes, the master node being further configured to maintain an indication of "owner of process" assigned to exactly one of the interconnectable nodes at a time; wherein a first node not being the master node but being indicated as "owner of process", is configured to cause the master node to instantiate a state or to modify a state; wherein the first node is further configured upon receiving a request for instantiating or modifying a state from a second node to decide whether or not to accept the request of the second node and to cause the master node to instantiate a state and to modify a state, such that the first node needs not to be connected at the time the second node is sending the request to perform a state change.

8 Claims, 11 Drawing Sheets

SYSTEM FOR MODELING A PROCESS

The present patent application is a non-provisional application of International Application No. EP04107063.2, filed Dec. 30, 2004.

BACKGROUND OF THE INVENTION

1. Field

The present invention relates to distributed systems for modeling processes represented by objects assuming a plurality of states.

2. Background

The modeling of processes by distributed systems comprising a plurality of interconnectable nodes makes it desirable to control the flow of communication between nodes such that individual states are maintained coherently over the plurality of interconnectable nodes.

Moreover, it is desired to operate each node of the distributed system of interconnectable nodes in such a way that none of the nodes is required to wait for another node to complete a processing operation concerning state creation or state modification.

SUMMARY OF THE INVENTION

One embodiment of the present invention provides a system of a plurality of interconnectable nodes for modelling a plurality of states representing a process;
  wherein one predetermined node is configured to act as a master node, the master node being configured to instantiate a state by creating the state and distributing the created state to at least one of the nodes, the master node being further configured to modify a state by changing the state and distributing the changed state to at least one of the nodes, the master node being further configured to maintain an indication of "owner of process" assigned to exactly one of the interconnectable nodes at a time;
  wherein a first node not being the master node but being indicated as "owner of process", is configured to cause the master node to instantiate a state or to modify a state;
  wherein the first node is further configured upon receiving a request for instantiating or modifying a state from a second node to decide whether or not to accept the request of the second node and to cause the master node to instantiate a state and to modify a state, respectively;
  such that the first node needs not to be connected at the time the second node is sending the request to perform a state change.

A further embodiment, the present invention provides a method for modeling a plurality of states representing a process, the modeling being carried out in a system comprising a plurality of interconnectable nodes, the method comprising the following:
  configuring (110) one predetermined node to act as a master node, the master node being capable of instantiating a state by creating the state and distributing the created state to at least one of the nodes, the master node being further capable to modify a state by changing the state and distributing the changed state to at least one of the nodes, the master node being further capable to maintain an indication of "owner of process" assigned to exactly one of the interconnectable nodes at a time;
  configuring (120) a first node not being the master node but being indicated as "owner of process" to cause the master node to instantiate a state or to modify a state;
  further configuring (130) the first node upon receiving a request for instantiating or modifying a state from a second node to decide whether or not to accept the request of the second node and to cause the master node to instantiate a state and to modify a state, respectively;
  such that the first node needs not to be connected at the time the second node is sending the request to perform a state change.

Advantageous implementations can include one or more of the following features.

The master node may be configured to act as dispatcher for a request for instantiating or modifying a state received from a node which is not indicated as "owner of process" by passing the request to the node which is indicated as "owner of process".

A predetermined order of a plurality of requests for instantiating or modifying a state may be maintained.

A further embodiment of the invention is configured to maintain the predetermined order by using queued remote function calls.

The multi-node system for modeling processes represented by a plurality of states according to the invention has the advantage to coordinate the flow of communication between interconnectable nodes such that none of the nodes is required to enter a wait state until any state creation or state modification operation in a different node is completed.

It is a further advantage of a multi-node system according to the invention to eliminate or reduce the need to have individual nodes of the system permanently connected in order to maintain coherent object states over the plurality of distributed nodes.

A further advantage of the system according to the invention is fault tolerance. A request lost in inter-node communication will not destroy the consistency of information maintained in different nodes concerning any states involved in the request.

BRIEF DESCRIPTION OF DRAWINGS

The accompanying drawings, which constitute a part of the specification, illustrate embodiments of the invention, and may serve in connection with the description to explain principles of the invention.

In the drawings.

DETAILED DESCRIPTION

Figure 1:
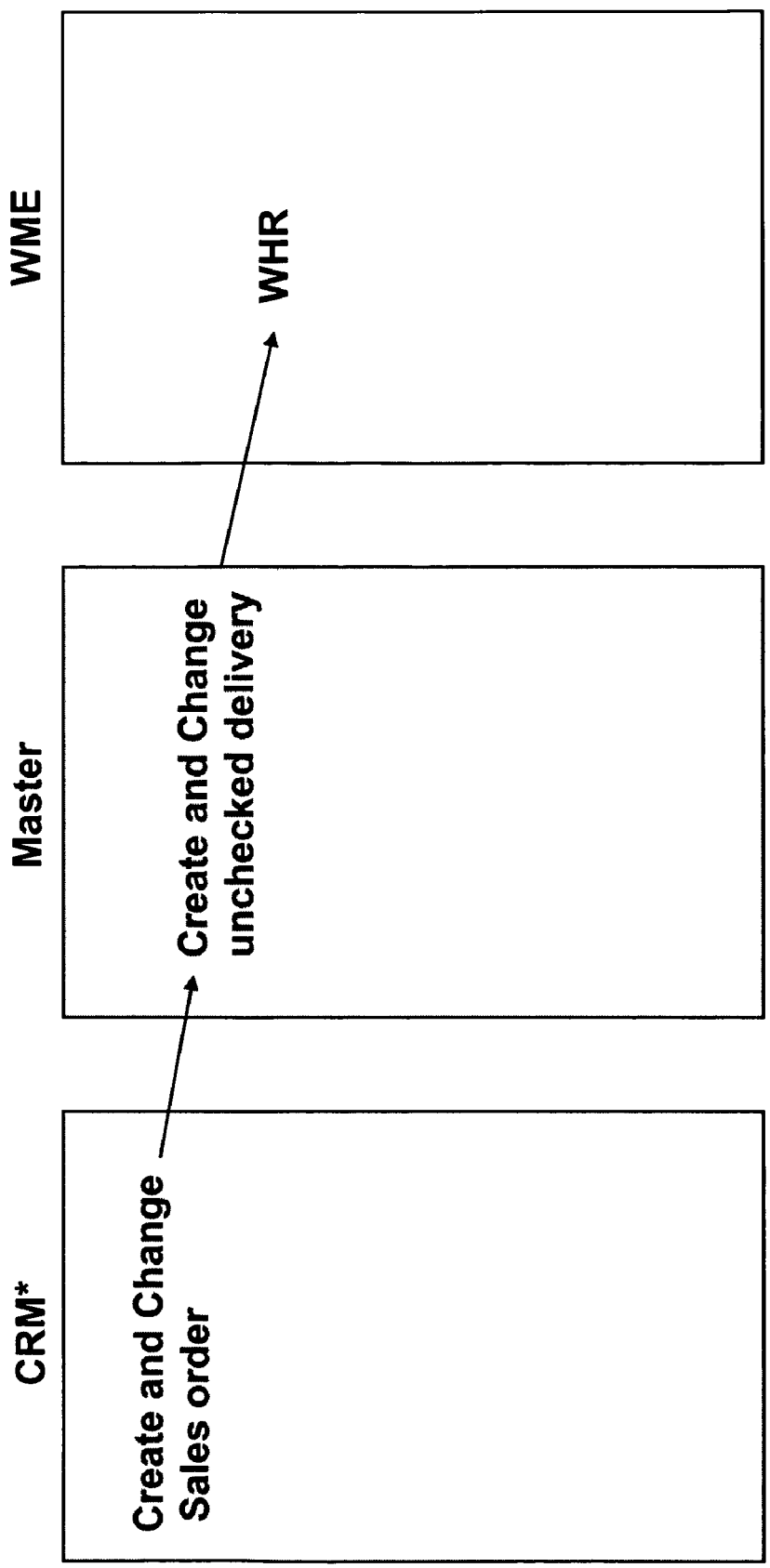
FIG. 1 shows an outbound (sell from stock) processing operation according to the present invention.

The following terms will be used throughout this description.

An unchecked delivery describes an outbound or returns delivery in a master node representing a sales order created in a different node. For an unchecked delivery all checks during delivery creation time that could prevent the delivery from being created as requested are skipped. Unchecked deliveries can only be changed through a sales order and cannot be used in subsequent processing operations.

A checked delivery is an outbound or returns delivery in a master node which results from performing all required delivery checks, in particular the available-to-promise (ATP) check, on an unchecked delivery. The checked delivery can be processed without any restrictions. If not mentioned explicitly in the following the term "delivery" always denotes a checked delivery.

Outbound deliveries in master node created with respect to preceding requests or documents located in the same node and inbound deliveries are always created as unchecked deliveries because the delivery checks have already been completed during their creation.

Cross system locking determines a lock mechanism that allows the processing of requests or documents distributed across node boundaries and that protects the linked request or documents against competing modifications or changes.

An advance shipping notification comprises a notification by a vendor of the anticipated arrival of goods shipped by the vendor on the recipient's premises. The shipping notification contains the anticipated delivery date, quantities and details of the materials (and/or services). A shipping notification can be sent in the form of an EDI message, by facsimile or other media. An incoming shipping notification is stored in master node as an inbound delivery document. An outgoing shipping notification can be generated on the basis of an outbound delivery.

An advanced shipping notification may be an Electronic Data Interchange (EDI) file received from vendors/suppliers or a central packaging facility indicating the material that is on the way to a warehouse.

A warehouse management engine (WME) provides flexible, automated support in processing all goods movements and in managing stocks in a warehouse complex. The system supports scheduled and efficient processing of all logistic possesses within a warehouse.

A warehouse management request (WMR) is a document, which can be received by or created in a warehouse management engine. The warehouse request is a request for the warehouse to handle a quantity of a material, which should be picked, put away or just for a posting change. The origin of a warehouse request is normally a process which is started in another system. For inbound processes this would be a purchasing system, for outbound processes this would be a sales order system. The warehouse request can also be used to trigger moves internal to a warehouse, which do not have a source in another system. Warehouse requests are used to build wares and to fulfill warehouse requests, for example creating transfer orders based on the requests.

A core interface comprises a software layer that is responsible for the communication between the master node and additional nodes.

An inventory collaboration hub (ICH) describes a platform to provide central access for suppliers and merchandisers. An inventory collaboration hub application may provide a web user interface to display and maintain data concerning advance shipping notices.

A remote function call enables the calling node to execute predetermined functions in a remote node—or even in the same node. Remote function calls may manage communication processes, parameter transfers, error handling, and the like.

A queued remote function call uses inbound and/or outbound queues to serialize the data that are sent in or out.

A business document or message is a document or message that contains information on changes made to business objects. Business documents are used for data exchange and data processing within a system according to the invention.

The flow of communication between nodes of a system according to the invention will now be described for individual processing operations. Communication in these processing operations may be based on asynchronous serialized function calls.

FIGS. 1 to 10 show individual processing operations by their communication between respective nodes. In these figures the asterisk symbol (*) uniquely designates the node which is indicated as "owner of process" for the process operation described, whereas arrowed lines designate asynchronous communication operations.

FIG. 1 shows an outbound (sell from stock) processing operation. In this processing operation sales originating from a customer relation management (CRM) node have to be replicated in a master node as unchecked deliveries. With the conversion in the master node of the unchecked deliveries into checked deliveries, the deliveries may become productive for execution in a warehouse engine (WME) node as warehouse requests. The relationship between the corresponding documents or request is not a 1:1 relationship. For one sales order item originating from a customer relation management (CRM) node there can be more than one delivery notices in the master node and more than one warehouse request in the WME node. Some changes in states or documents have to be distributed to other states or documents or have to trigger independent functions for other states or documents. Possibly some changes may not be executed immediately, depending on the kind of change and/or particular node currently indicated as "owner of process".

In FIG. 1 a CRM node is designated as "owner of process" during a processing period wherein a sales order item is only mapped to unchecked deliveries in the master node. An unchecked delivery may be subject to all kinds of changes. This means the CRM node can change the sales order item without any restrictions. Pending changes will be sent to the master node, the master node will change the corresponding unchecked deliveries. Information concerning unchecked deliveries may be distributed to the WME node. Unchecked deliveries only serve as a warehouse demand for warehouse planning purposes and can comprise any changes originating from the CRM node.

Figure 2:
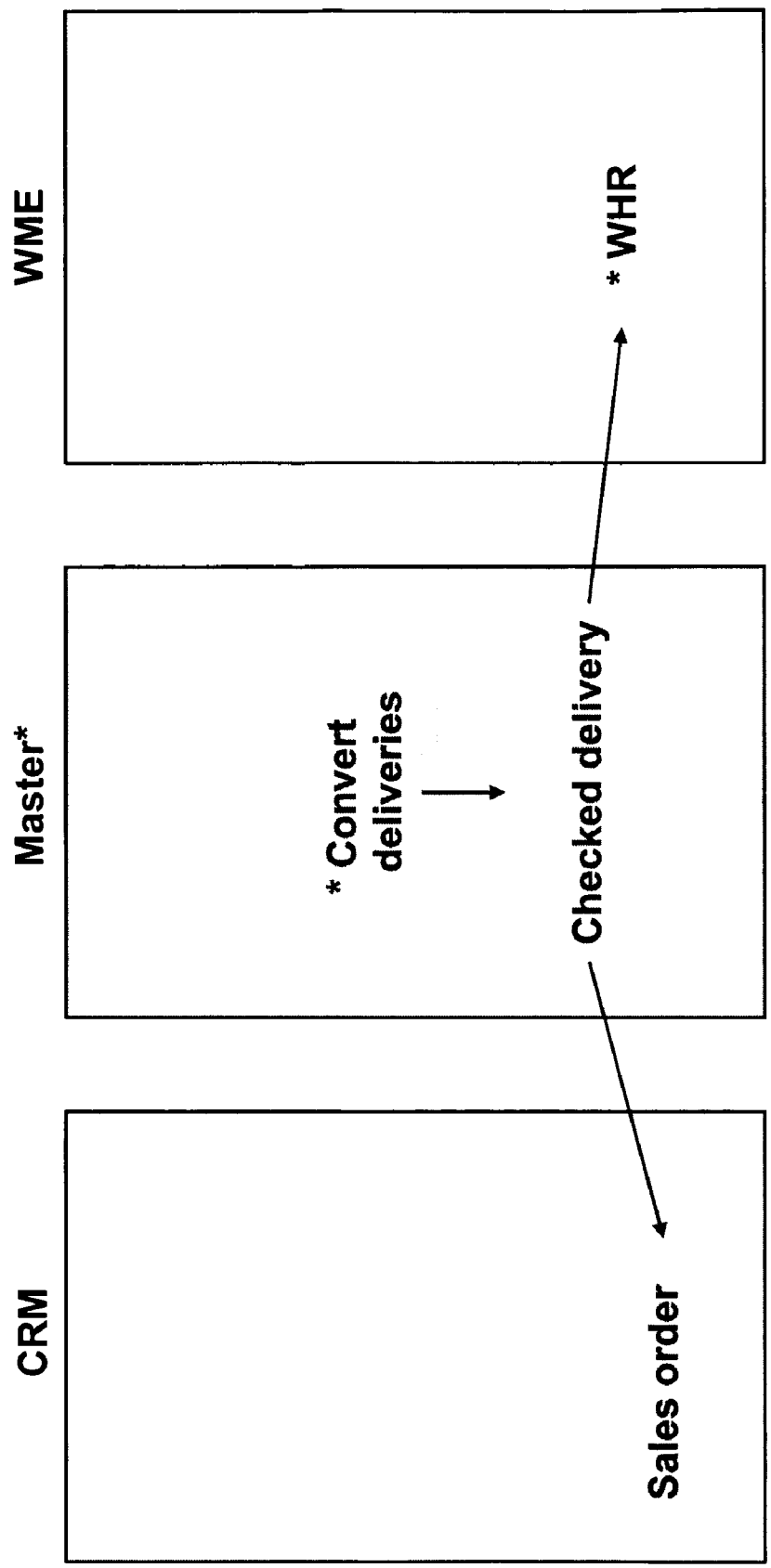
FIG. 2 shows an outbound (conversion of delivery) processing operation.

FIG. 2 shows an outbound (conversion of delivery) processing operation. When the master node starts to convert an unchecked delivery to a checked delivery the indication "owner of process" is moved from the CRM node to the master node. It is to be noted that during the time of conversion no cross system locking is required for the corresponding sales order item. A global ATP check against stock can be called upon during conversion from unchecked deliveries to checked deliveries. A checked delivery may be distributed to the WME node and to the CRM node. Upon completion of this processing operation the indication "owner of process" will move to the WME node. Thereafter, the CRM node will have only restricted permission to change this particular sales order item. The conversion may be carried out independently from other nodes. The receiving CRM node and WME node respectively does not have to be available at the time of the conversion. Nor need any other nodes to be locked. Competing changes may require special handling.

Figure 3:
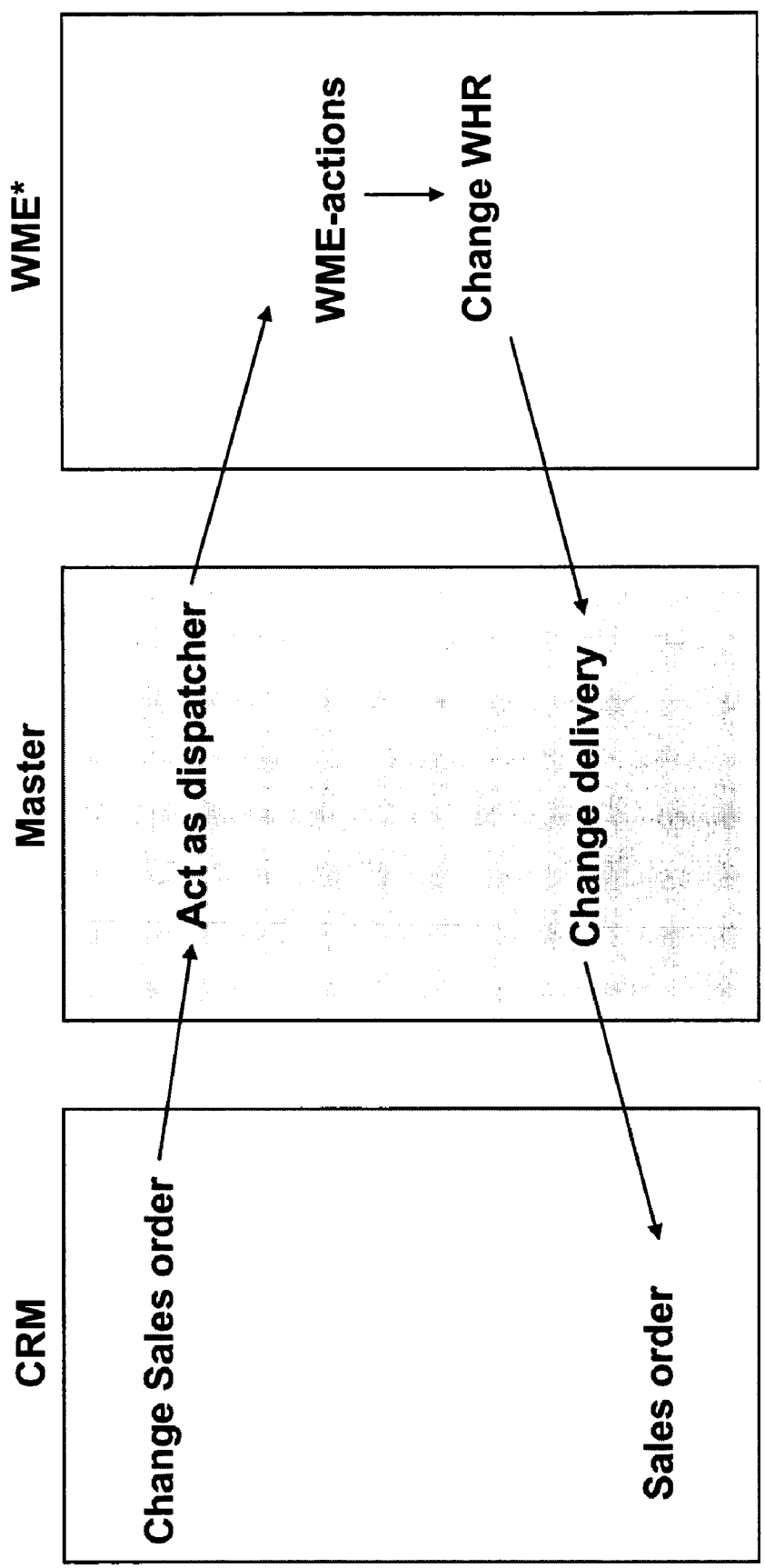
FIG. 3 shows another outbound processing operation.

FIG. 3 shows an outbound processing operation wherein a WME node is indicated as "owner of process". Since the WME node is indicated as "owner of process" the master node will act as a dispatcher. If a change request from the CRM node arrives at the master node that is authorized for changes of checked deliveries, the master node will dispatch the change request to the WME node. If the change request can be executed in the WME node the change related to the request from the WME node will be distributed to the master node and result in a change of the checked delivery. The change will be communicated to the CRM node as a change of the delivery. In order to maintain consistent states of objects over the nodes of the system according to the invention it may be necessary to distribute change requests and the corresponding changes together with a serialization maintained over the entire system.

The flow of communication shown in FIG. 3 will be called "change by the owner of process" and may be used for changes triggered by a WME node as well.

Figure 4:
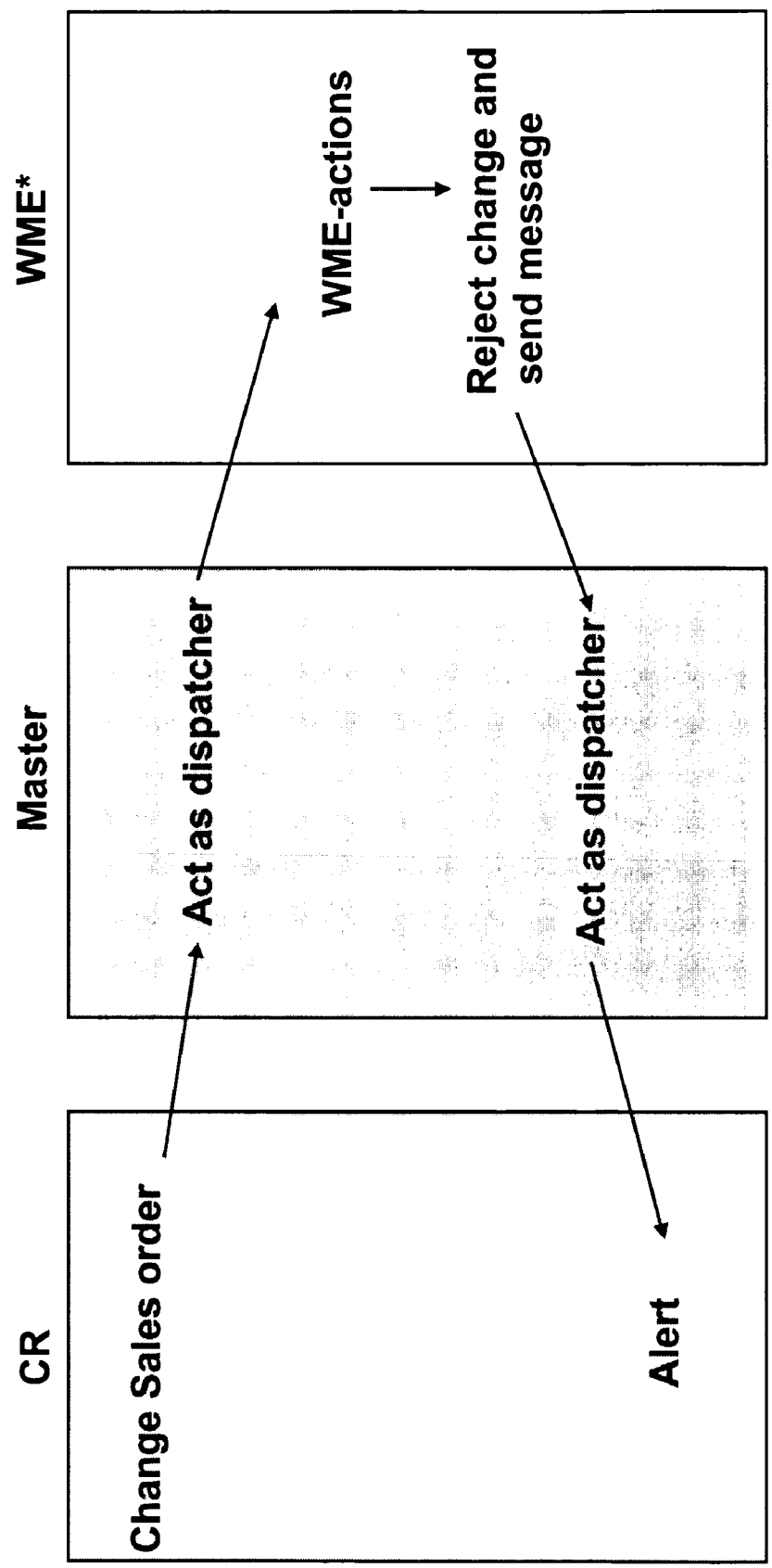
FIG. 4 shows yet another outbound processing operation.

FIG. 4 shows another outbound processing operation. In this enquiry scenario WME node is indicated as "owner of process". A CRM node sends a change request to the master node. If a change request arrives from a CRM node in the master node having permission for checked deliveries, the master node will dispatch any change request to the WME node. If the change request cannot be executed in the WME node the change request will be rejected and WME node will send a message to the master node. Master node will act as dispatcher and communicate the message of rejection to the CRM node.

Vendors may send their advanced shipping notifications directly to the master node or create an advanced shipping notification in an inventory collaboration hub (ICH) node and send it to master node. In the master node a validation step may be executed. If validation is positive an inbound delivery processing operation will be created. The delivery operation is replicated in the WME node as a warehouse request. The master node may update or create, respectively, the advanced shipping notification and send it to the ICH node. The exchange of information between respective states or documents must be initiated for each individual change request of this communication chain. It may be necessary to communicate the progress of the processing operation carried out by the WME node for the respective warehouse request to other nodes.

Figure 5:
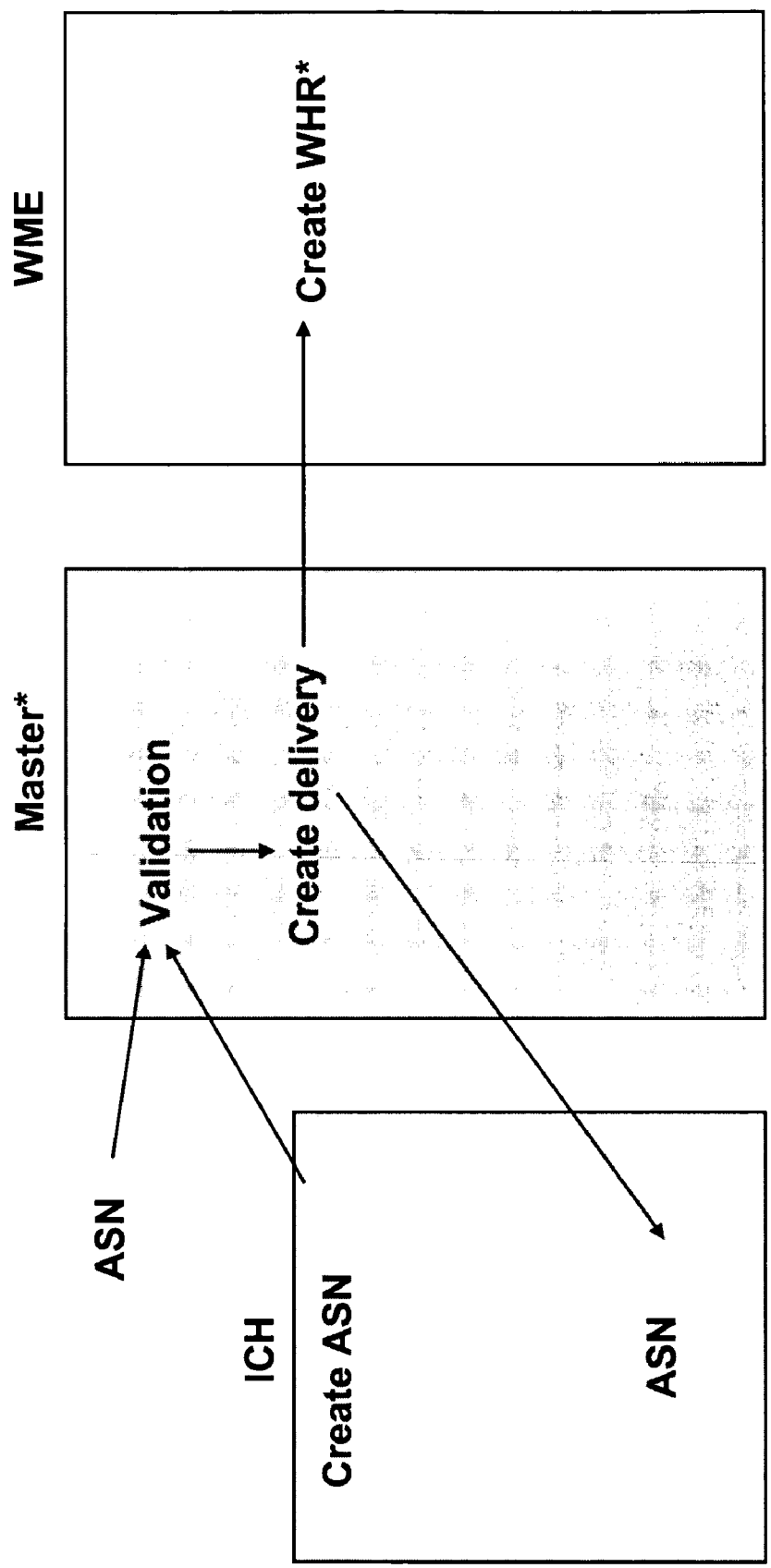
FIG. 5 shows an inbound (create) processing operation.

FIG. 5 shows an inbound (create) processing operation. For an initial creation of an inbound delivery state master node will be indicated as "owner of process". A vendor sends an advanced shipping notification directly or via an inventory collaboration hub (ICH) node, thereby triggering a validation operation in the master node. If the validation is positive an inbound delivery state will be created and distributed to a WME node. The WME node will create a warehouse request. Master node may update or create an advanced shipping notification and send it to ICH node. At this point the indication of "owner of process" may change to the WME node. If the validation is negative a decision may be made whether the inbound delivery state is distributed to the WME node or not.

In case of a negative validation master node may communicate the negative validation to the ICH node by sending a log message to the inventory collaboration hub.

Figure 6:
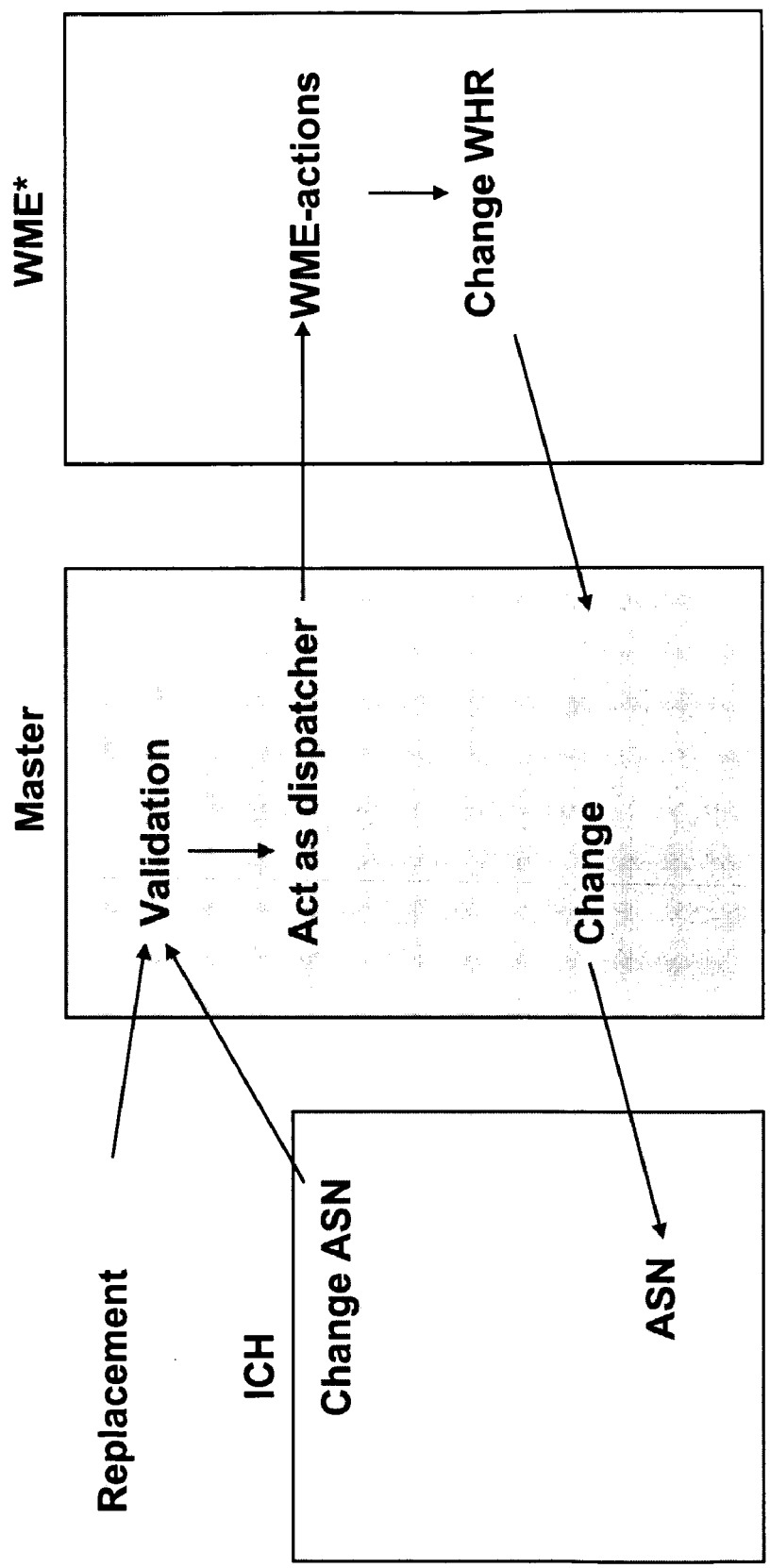
FIG. 6 shows an inbound (change) processing operation.

FIG. 6 shows an inbound (change) processing operation wherein WME node is assumed to be indicated as "owner of process". When a replacement advanced shipping notification is received directly or via an inventory collaboration hub (ICH) node a validation operation may be executed in the master node. If the validation is positive the master node will dispatch the change request to a WME node. The WME node may decide whether the corresponding change is allowed for the warehouse request or not. If the change is not allowed the WME node will modify the warehouse request and will return the warehouse request to the master node. Master node will change the inbound delivery state and will communicate the corresponding changes to the ICH node.

If the validation is negative, master node will communicate the negative validation to the ICH node by sending a log message to the ICH node. The flow of communication described is be called "normal way of changes" and may be used for a change request triggered by a WME node as well.

Figure 7:
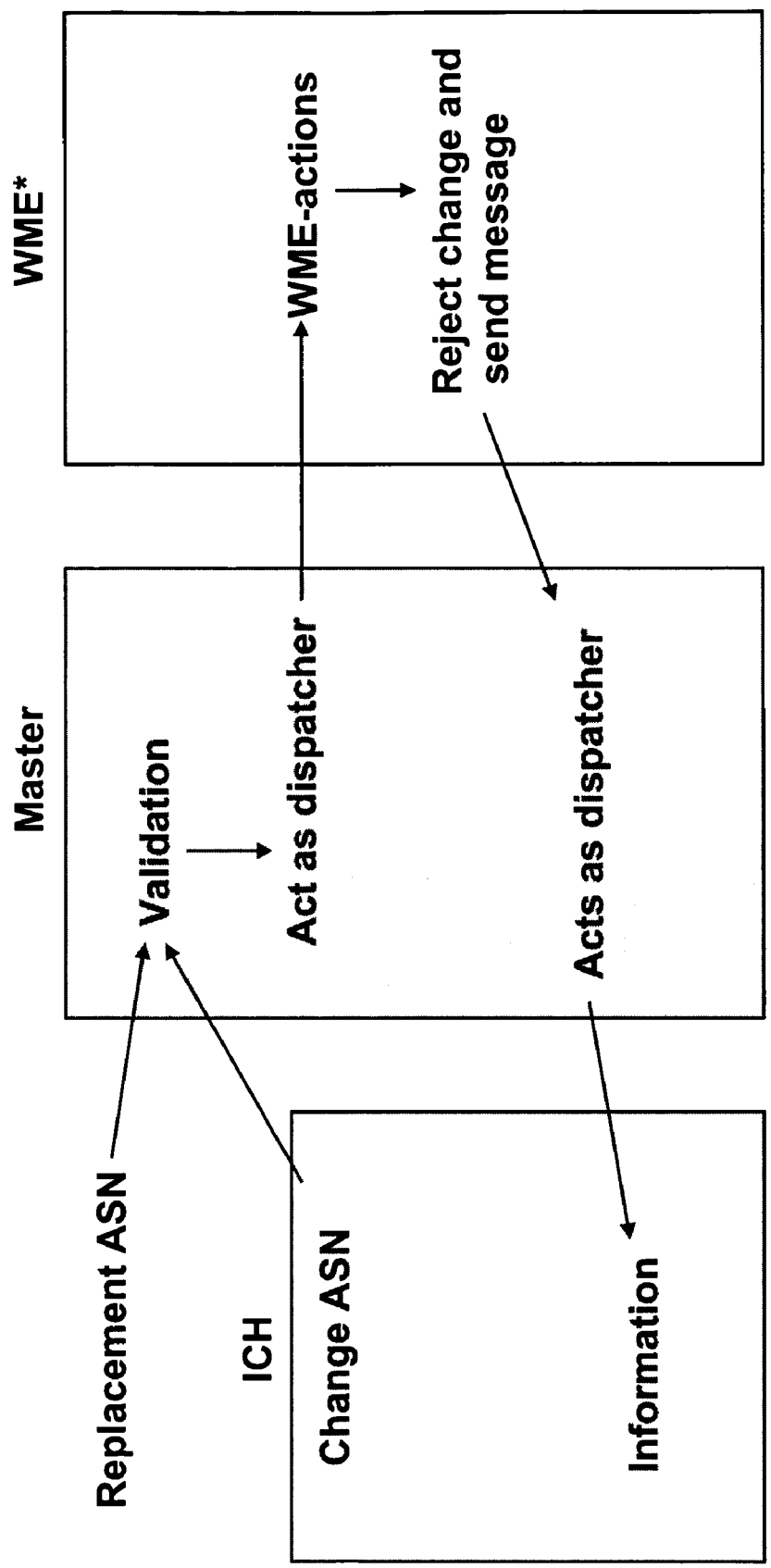
FIG. 7 shows another inbound (change) processing operation.

FIG. 7 shows another inbound (change) processing operation. Again WME node is assumed to be indicated as "owner of process". A replacement advanced shipping notification received directly or from an ICH node will trigger a validation operation in the master node. Provided the validation is positive, master node will dispatch the corresponding changes as a change request to a WME node. Since the WME node is indicated as "owner of process" this node will decide if the change is allowed. If the change is not allowed the WME node will be reject the requested change. The WME node will communicate a message of rejection to the master node. Master node will act as dispatcher and send the message of rejection to the ICH node.

Next a description of a returns processing operation will be given, covering only the main processing operations concerning inter-node communication. The description ends with the goods receipt state reached at the first warehouse.

The returns processing operation starts in a CRM node based on a returns request from a dealer. If the returns request is approved a corresponding returns request is created and CRM node may initiate the creation of a corresponding returns delivery state in the master node.

After the returns request is created the corresponding dealer will get the information through a dealer portal node. The dealer may confirm the returns request by sending an "accept approval" through the dealer portal node. The "accept approval" message contains the actual quantities the dealer wants to return for each order and basic packing information.

The "accept approval" message is processed in the master node. The carrier who picks up the goods at the dealer's site may consolidate the returns from different dealers and ship them together to the warehouse. The carrier may enter the shipment information in the carrier portal node. Both messages, from the dealer and/or carrier may change the returns delivery state in the master node. The actual state of the returns delivery state is returned to the CRM node.

A node configuration application may queue for each dealer individually whether the dealer will submit an "accept approval" message and whether the carrier involved will submit a shipment message. The distribution of the delivery state to the WME node will only take place after the expected messages from the corresponding dealer and the corresponding carrier have been received by the master node.

Figure 8:
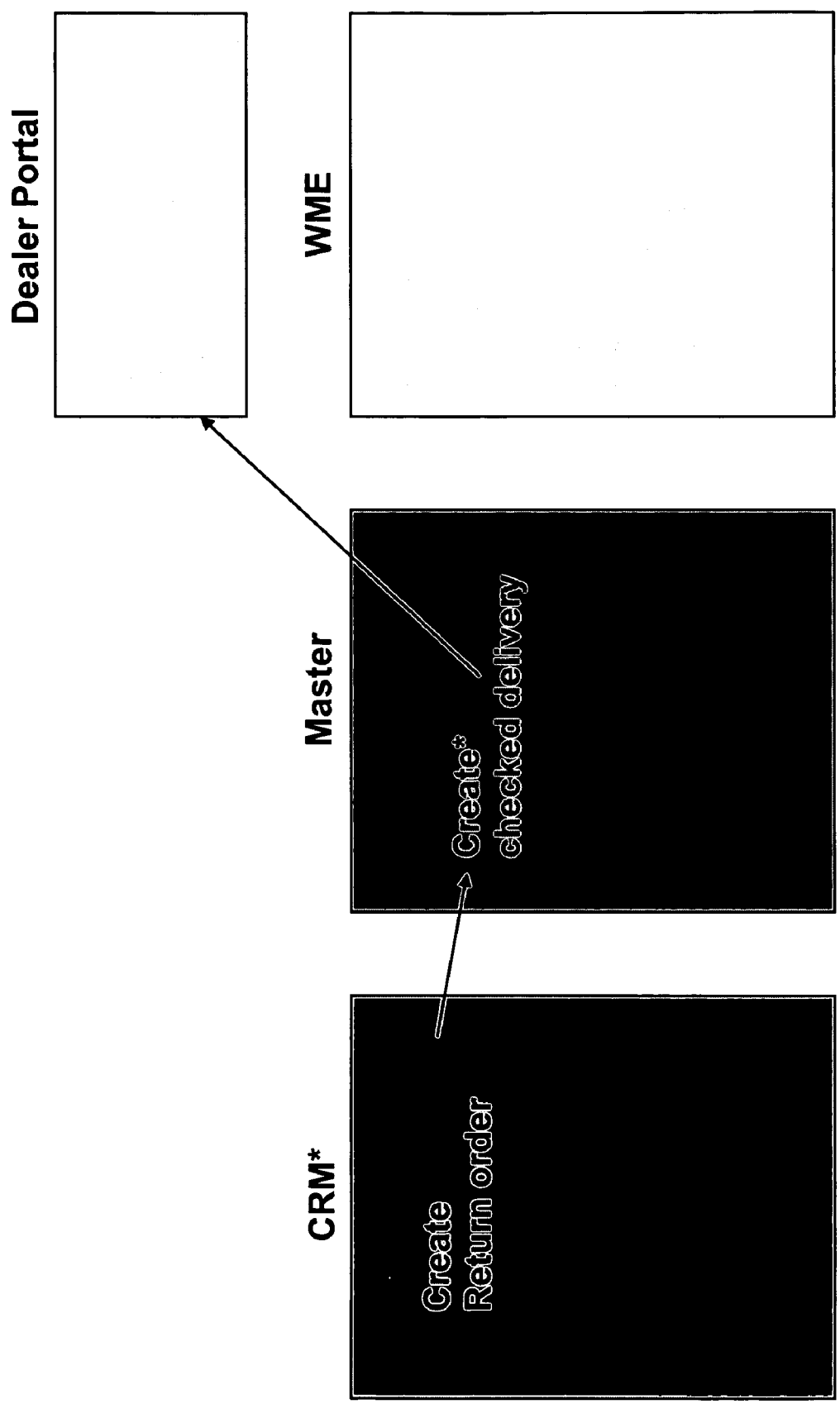
FIG. 8 shows a returns processing operation.

The following FIG. 8 does not show the carrier portal. However, from a communication point of view that carrier portal is comparable with the dealer portal.

FIG. 8 shows a returns processing operation wherein CRM node is indicated as "owner of process". After receiving a return request from a dealer CRM node creates a returns request and is indicated as "owner of process". The returns request will be distributed by CRM node to master node. Master node directly creates checked returns delivery states. Master node will be indicated as "owner of process" during the time wherein the delivery state is not distributed to WME node. Depending on the content of expected messages from the corresponding dealer and the corresponding carrier the delivery state will be distributed to the corresponding WME node as a warehouse request.

Figure 9:
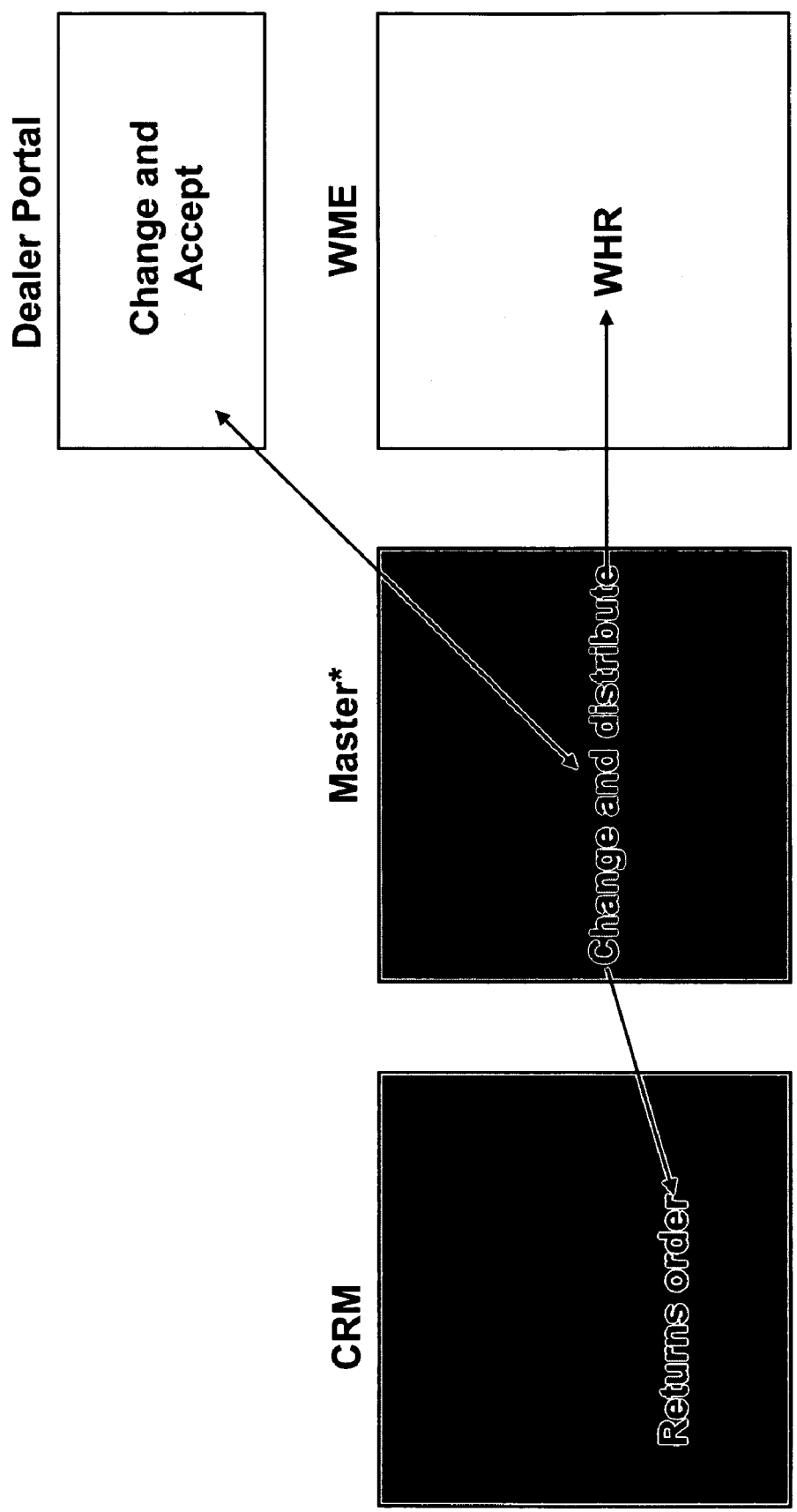
FIG. 9 shows a returns ("accept approval") processing operation.

FIG. 9 shows a returns ("accept approval") processing operation. Master node is still assumed to be indicated as "owner of process". Corresponding changes to a delivery state and the "accept approval" message will be modified in a dealer portal node. Master node may change the returns delivery state and distribute the returns delivery state as a warehouse request to WME node, depending on the contents of messages expected from dealer node and carrier node, respectively. The "accept approval" state will be set in master node for the corresponding delivery state. Upon creation of the warehouse request the WME node will be indicated as "owner of process".

If the "accept approval" state is required and the corresponding dealer didn't send an "accept approval" message even though the parts already arrive in the warehouse, corresponding distribution may be triggered from master node to WME node. This is regarded as an exceptional processing operation since a dealer is obliged to send an "accept approval" message.

The concept to have master node indicated as "owner of process" until the "accept approval" message arrives from the corresponding dealer node ensures that no conflicts can occur between "accept approval" messages from the dealer node and the beginning execution in the warehouse.

Figure 10:
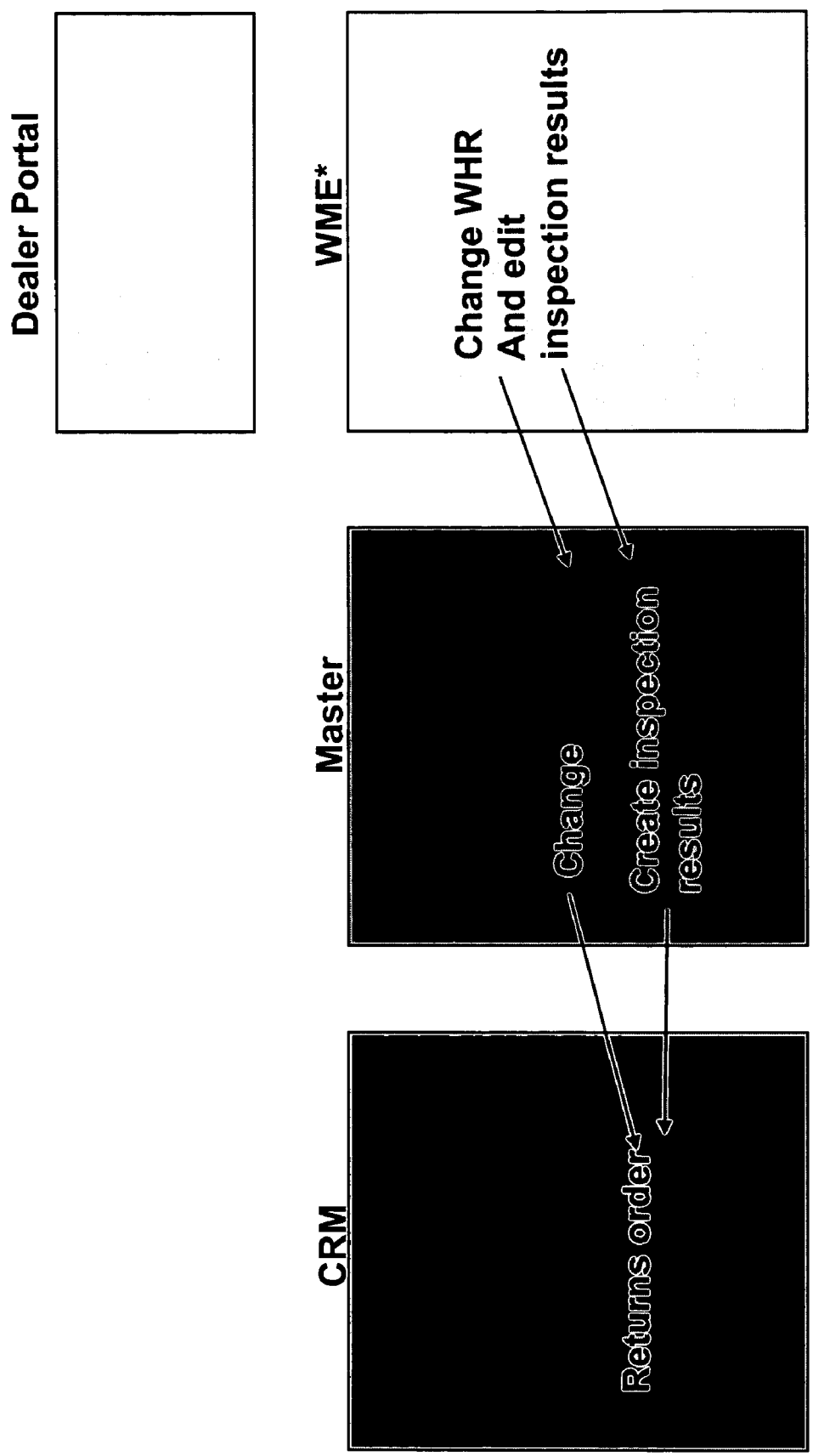
FIG. 10 shows another returns processing operation.

FIG. 10 shows a returns (WME node activities) processing operation. WME node is assumed to be indicated as "owner of process". WME node will modify the warehouse request and cover the inspection results. Corresponding changes to the warehouse request sent to the inspection results will be distributed through master node and from master node to the CRM node. Inspection results will be kept in master node as an own object with a link to the corresponding delivery state.

Stock transfers require a stock transport order in master node. On the basis of a stock transport order an outbound delivery state will be created on the one hand and an inbound delivers state on the other hand. As a consequence the communication of the corresponding deliveries to a WME node may include the processing operations from outbound and inbound processing operations, respectively.

Figure 11:
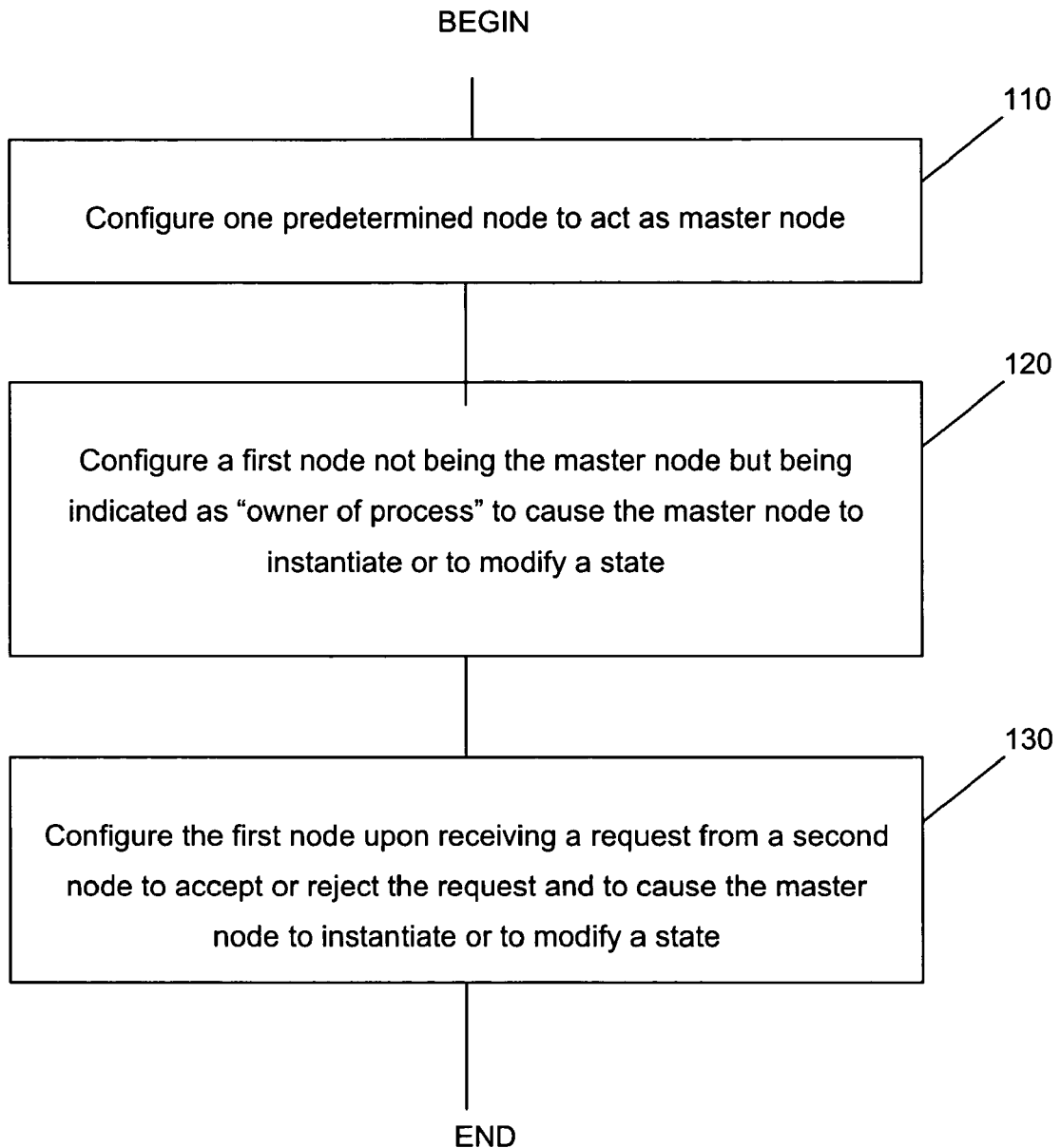
FIG. 11 shows a schematic flow chart comprising operation carried out by a one embodiment of the present invention.

FIG. 11 shows a preferred embodiment of the method of the present invention. In this method a plurality of states representing a process are modeled in a system comprising a plurality of interconnectable nodes.

In a first element 110 of the method one predetermined node is configured to act as a master node, the master node being capable of instantiating a state by creating the state and distributing the created state to at least one of the nodes, the master node being further capable to modify a state by changing the state and distributing the changed state to at least one of the nodes, the master node being further capable to maintain an indication of "owner of process" assigned to exactly one of the interconnectable nodes at a time.

In a second element 120 of the method a first node not being the master node but being indicated as "owner of process" is configured to cause the master node to instantiate a state or to modify a state.

In a third element 130 of the method the first node is configured upon receiving a request for instantiating or modifying a state from a second node to decide whether or not to accept the request of the second node and to cause the master node to instantiate a state and to modify a state, respectively.

In the method according to the invention the first node needs not to be connected to the system at the time the second node is sending the request to perform a state change.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method operations according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. A system of a plurality of interconnectable nodes for modeling a plurality of states representing a process, the system comprising;

one predetermined node configured to act as a master node, the master node being configured to instantiate a state and distributing the instantiated state to at least one of the nodes, the master node being further configured to modify a state by changing the state and distributing the changed state to at least one of the nodes, the master node being further configured to maintain an indication of "owner of process" assigned to exactly one of the interconnectable nodes at a time;

wherein a first node not being the master node but being indicated as "owner of process", is configured to cause the master node to instantiate a state or to modify a state;

the first node further configured upon receiving a request for instantiating or modifying a state from a second node to decide whether or not to accept the request of the second node and to cause the master node to instantiate a state and to modify a state, respectively, whether or not the first node is connected at the time the second node is sending the request to perform a state change; and wherein the master node is configured to act as dispatcher for a request for instantiating or modifying a state received from a node which is not indicated as "owner of process" by passing the request to the node which is indicated as "owner of process".

2. The system of claim 1, which is further configured to maintain a predetermined order of a plurality of requests for instantiating or modifying a state.

3. The system of claim 2, which is further configured to maintain the predetermined order by means of queued remote function calls.

4. A method for modeling a plurality of states representing a process, the modeling being carried out in a system comprising a plurality of interconnectable nodes, the method comprising:

configuring one predetermined node to act as a master node, the master node being capable of instantiating a state and distributing the instantiated state to at least one of the nodes, the master node being further capable to modify a state by changing the state and distributing the changed state to at least one of the nodes, the master node being further capable to maintain an indication of "owner of process" assigned to exactly one of the interconnectable nodes at a time;

configuring a first node not being the master node but being indicated as "owner of process" to cause the master node to instantiate a state or to modify a state;

further configuring the first node upon receiving a request for instantiating or modifying a state from a second node to decide whether or not to accept the request of the second node and to cause the master node to instantiate a state and to modify a state, respectively, whether or not the first node is connected at the time the second node is sending the request to perform a state change; and configuring the master node to be capable to act as dispatcher for a request for instantiating or modifying a state received from a node which is not indicated as "owner of process" by passing the request to the node which is indicated as "owner of process".

5. The method of claim 4, further comprising:

maintaining a predetermined order of a plurality of requests for instantiating or modifying a state.

6. The method of claim 5, wherein the predetermined order is maintained by queued remote function calls.

7. A non-transitory machine-accessible medium containing instructions that when executed cause a machine to:

configure one predetermined node to act as a master node amongst a plurality of interconnectable nodes, the master node being capable of instantiating a state and distributing the instantiated state to at least one of the nodes, the master node being further capable to modify a state by changing the state and distributing the changed state to at least one of the nodes, the master node being further capable to maintain an indication of "owner of process" assigned to exactly one of the interconnectable nodes at a time;

configure a first node not being the master node but being indicated as "owner of process" to cause the master node to instantiate a state or to modify a state;

further configure the first node upon receiving a request for instantiating or modifying a state from a second node to decide whether or not to accept the request of the second node and to cause the master node to instantiate a state and to modify a state, respectively, whether or not the first node is connected at the time the second node is sending the request to perform a state change; and configure the master node to be capable to act as dispatcher for a request for instantiating or modifying a state received from a node which is not indicated as "owner of process" by passing the request to the node which is indicated as "owner of process".

8. The non-transitory machine accessible medium of claim 7, wherein the instructions further cause the machine to:

maintain a predetermined order of a plurality of requests for instantiating or modifying a state.

* * * * *